(12) United States Patent
Lawson et al.

(10) Patent No.: US 11,889,027 B2
(45) Date of Patent: Jan. 30, 2024

(54) TELEPHONY WEB EVENT SYSTEM AND METHOD

(71) Applicant: Twilio Inc., San Francisco, CA (US)

(72) Inventors: Jeffrey Gordon Lawson, San Francisco, CA (US); John Robert Wolthuis, San Francisco, CA (US); Evan Mansfield Cooke, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 18/125,026

(22) Filed: Mar. 22, 2023

(65) Prior Publication Data

US 2023/0231952 A1 Jul. 20, 2023

Related U.S. Application Data

(63) Continuation of application No. 17/301,335, filed on Mar. 31, 2021, now Pat. No. 11,665,285, which is a
(Continued)

(51) Int. Cl.
| | | |
|---|---|---|
| *H04M 7/00* | (2006.01) | |
| *H04L 12/66* | (2006.01) | |
| *H04M 3/22* | (2006.01) | |
| *H04M 15/00* | (2006.01) | |
| *H04L 51/52* | (2022.01) | |
| *H04L 67/02* | (2022.01) | |

(Continued)

(52) U.S. Cl.
CPC .......... *H04M 7/0012* (2013.01); *H04L 12/66* (2013.01); *H04L 51/52* (2022.05); *H04L 67/02* (2013.01); *H04M 3/2209* (2013.01); *H04M 3/2218* (2013.01); *H04M 7/006* (2013.01); *H04M 15/00* (2013.01); *H04M 15/44* (2013.01); *H04M 15/90* (2013.01); *H04M 3/42229* (2013.01); *H04M 7/123* (2013.01); *H04M 7/128* (2013.01); *H04M 2215/0104* (2013.01); *H04M 2215/016* (2013.01); *H04M 2215/018* (2013.01)

(58) Field of Classification Search
CPC ............ H04M 7/0012; H04M 3/2209; H04M 3/2218; H04M 7/006; H04M 15/00; H04M 15/44; H04M 15/90; H04M 3/42229; H04M 7/123; H04M 7/128; H04M 2215/0104; H04M 2215/016; H04M 2215/018; H04L 12/66; H04L 51/52; H04L 67/02
See application file for complete search history.

(56) References Cited

U.S. PATENT DOCUMENTS

| | | | | |
|---|---|---|---|---|
| 7,243,369 B2 * | 7/2007 | Bhat | ....................... | H04L 67/02 726/8 |
| 7,350,204 B2 * | 3/2008 | Lambert | ................. | G06F 21/51 717/172 |

(Continued)

*Primary Examiner* — Brian T O Connor
(74) *Attorney, Agent, or Firm* — Schwegman Lundberg & Woessner, P.A.

(57) ABSTRACT

An embodiment of the system for publishing events of a telephony application to a client includes a call router that generates events from the telephony application and an event router that manages the publication of events generated by the call router and that manages the subscription to events by clients. The system can be used with a telephony application that interfaces with a telephony device and an application server.

20 Claims, 11 Drawing Sheets

Related U.S. Application Data continuation of application No. 16/557,001, filed on Aug. 30, 2019, now Pat. No. 11,005,998, which is a continuation of application No. 16/241,746, filed on Jan. 7, 2019, now Pat. No. 10,455,094, which is a continuation of application No. 15/709,905, filed on Sep. 20, 2017, now Pat. No. 10,187,530, which is a continuation of application No. 15/193,416, filed on Jun. 27, 2016, now Pat. No. 9,807,244, which is a continuation of application No. 14/591,279, filed on Jan. 7, 2015, now Pat. No. 9,407,597, which is a continuation of application No. 12/572,258, filed on Oct. 1, 2009, now Pat. No. 8,964,726.

(60) Provisional application No. 61/102,007, filed on Oct. 1, 2008.

(51) Int. Cl.
*H04M 7/12* (2006.01)
*H04M 3/42* (2006.01)

(56) References Cited

U.S. PATENT DOCUMENTS

| | | | | |
|---|---|---|---|---|
| 7,454,459 | B1* | 11/2008 | Kapoor | H04L 67/02 |
| | | | | 707/999.203 |
| 7,849,306 | B2* | 12/2010 | Takeshima | H04L 67/02 |
| | | | | 713/153 |
| 7,929,562 | B2* | 4/2011 | Petrovykh | H04M 7/003 |
| | | | | 370/413 |
| 8,082,576 | B2* | 12/2011 | Flynn | H04L 63/20 |
| | | | | 726/5 |
| 8,200,845 | B2* | 6/2012 | Abouzour | H04L 67/55 |
| | | | | 709/206 |
| 8,355,394 | B2* | 1/2013 | Taylor | H04M 3/5237 |
| | | | | 370/351 |
| 8,943,552 | B2* | 1/2015 | McCann | H04L 63/08 |
| | | | | 726/4 |
| 9,407,597 | B2* | 8/2016 | Lawson | H04M 15/00 |
| 11,575,795 | B2* | 2/2023 | Lawson | H04L 65/1045 |
| 2013/0268680 | A1* | 10/2013 | Marton | H04L 67/561 |
| | | | | 709/226 |
| 2017/0156063 | A1* | 6/2017 | McCann | H04L 63/083 |

* cited by examiner

```
GET /foo.php HTTP/1.1
Host: demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 0
```

FIGURE 8A

```
POST /foo.php HTTP/1.1
Host: demo.twilio.com
Content-Type: application/x-www-form-urlencoded
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 11

Digits=1234
```

FIGURE 8B

```
GET /foo.php?digits=1234 HTTP/1.1
Host: demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 0
```

FIGURE 8C

```
GET foo.php HTTP/1.1
Host: demo.twilio.com
X-Twilio-SMSid=DE870AD708ED70AE87D0AE7DAD7
X-Twilio-SMSSenderId=415-555-1234
X-Twilio-SMSShortCode=11111
X-Twilio-AccountId=AAF4AF5AF8A9A885449F7A647AF84
Content-Length: 0
```

FIGURE 8D

```
GET foo.php HTTP/1.1
Host: demo.twilio.com
X-Twilio-SMSid=DE870AD708ED70AE87D0AE7DAD7
X-Twilio-SMSSenderId=415-555-1234
X-Twilio-SMSShortCode=11111
X-Twilio-AccountId=AAF4AF5AF8A9A885449F7A647AF84
Content-Length: 21 message=statusrequest
```

FIGURE 8E

```
GET foo.php?message=statusrequest HTTP/1.1
Host: demo.twilio.com
X-Twilio-SMSid=DE870AD708ED70AE87D0AE7DAD7
X-Twilio-SMSSenderId=415-555-1234
X-Twilio-SMSShortCode=11111
X-Twilio-AccountId=AAF4AF5AF8A9A885449F7A647AF84
Content-Length: 0
```

FIGURE 8F

XML Response

```
<?xml version="1.0" encoding="UTF-8"?>
<Response>
        <Collect
                successUrl="http://www.example.com/phonetree.php"
                numDigits="1"
                timeout=20
        >
                <Say voice="female">
For sales press one. For support press two. For the operator, press three.
                </Say>
        </Collect>
</Response>
```

FIGURE 9A

XML Response

```
<?xml version="1.0" encoding="UTF-8"?>
<Response>
        <sms address=415-555-5555>
                thanks for the your text, will call at 5 PM.
        </sms>
        <CallAtTime="17:00PST">
                Today
                <Dial>415-555-5309</Dial>

</CallAtTime>
</Response>
```

TELEPHONY WEB EVENT SYSTEM AND METHOD

CROSS-REFERENCE TO RELATED APPLICATIONS

This application is a continuation of U.S. patent application Ser. No. 17/301,335, filed Mar. 31, 2021, which is a continuation of U.S. patent application Ser. No. 16/557,001, filed on 30 Aug. 2019, which is a continuation of U.S. patent application Ser. No. 16/241,746, filed 7 Jan. 2019, which is a continuation of U.S. patent application Ser. No. 15/709, 905, filed 20 Sep. 2017, which is a continuation of U.S. patent application Ser. No. 15/193,416, filed 27 Jun. 2016, which is a continuation of U.S. patent application Ser. No. 14/591,279, filed 7 Jan. 2015, which is a continuation of U.S. patent application Ser. No. 12/572,258, filed 1 Oct. 2009, which claims the benefit of U.S. Provisional Application No. 61/102,007 filed on 1 Oct. 2008, all of which are hereby incorporated in their entirety by this reference.

TECHNICAL FIELD

This invention relates generally to the event notification field, and more specifically to an new and useful system and method in the telephony web event field.

BACKGROUND

In recent years, there has been a growing trend of both internet-enabled phones and "websites as software". These two markets thrive on the transfer of information, instantaneous communication, and interaction between remote devices. However, current systems do not provide a seamless integration of telephony actions with remotely hosted applications, with server-side components, or with front-end websites. For instance, it is currently extremely difficult (if not impossible) to relay events that happen during a telephony call to or from a website securely in real-time during the telephony call. In addition, separation of business logic from telephony components complicates the transfer of realtime events from the call infrastructure to other remote services. Thus, there is a need in the telephony field to create a new and useful telephony web event system and method. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Telephony Web Event System

Figure 1:
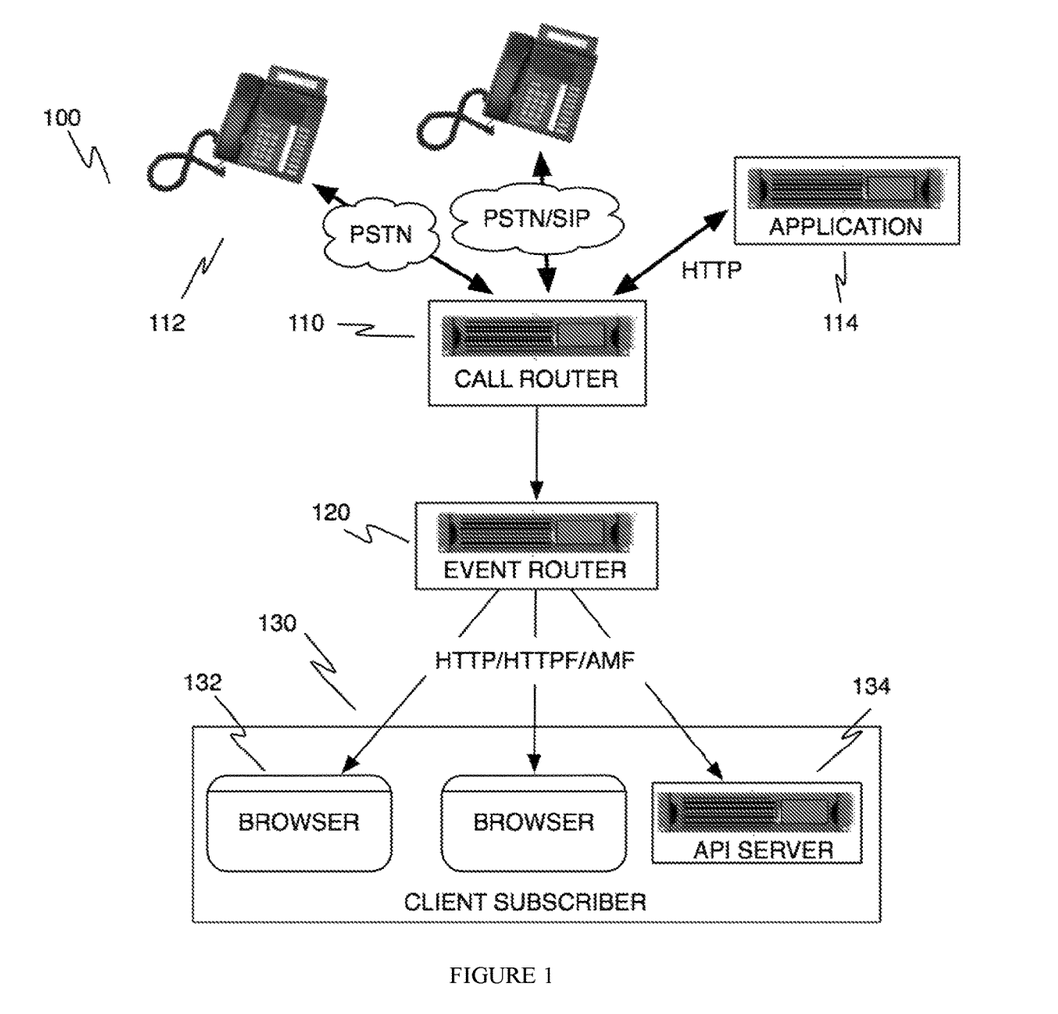
FIG. 1 is a schematic diagram of the preferred embodiment of the invention.
Figure 2:
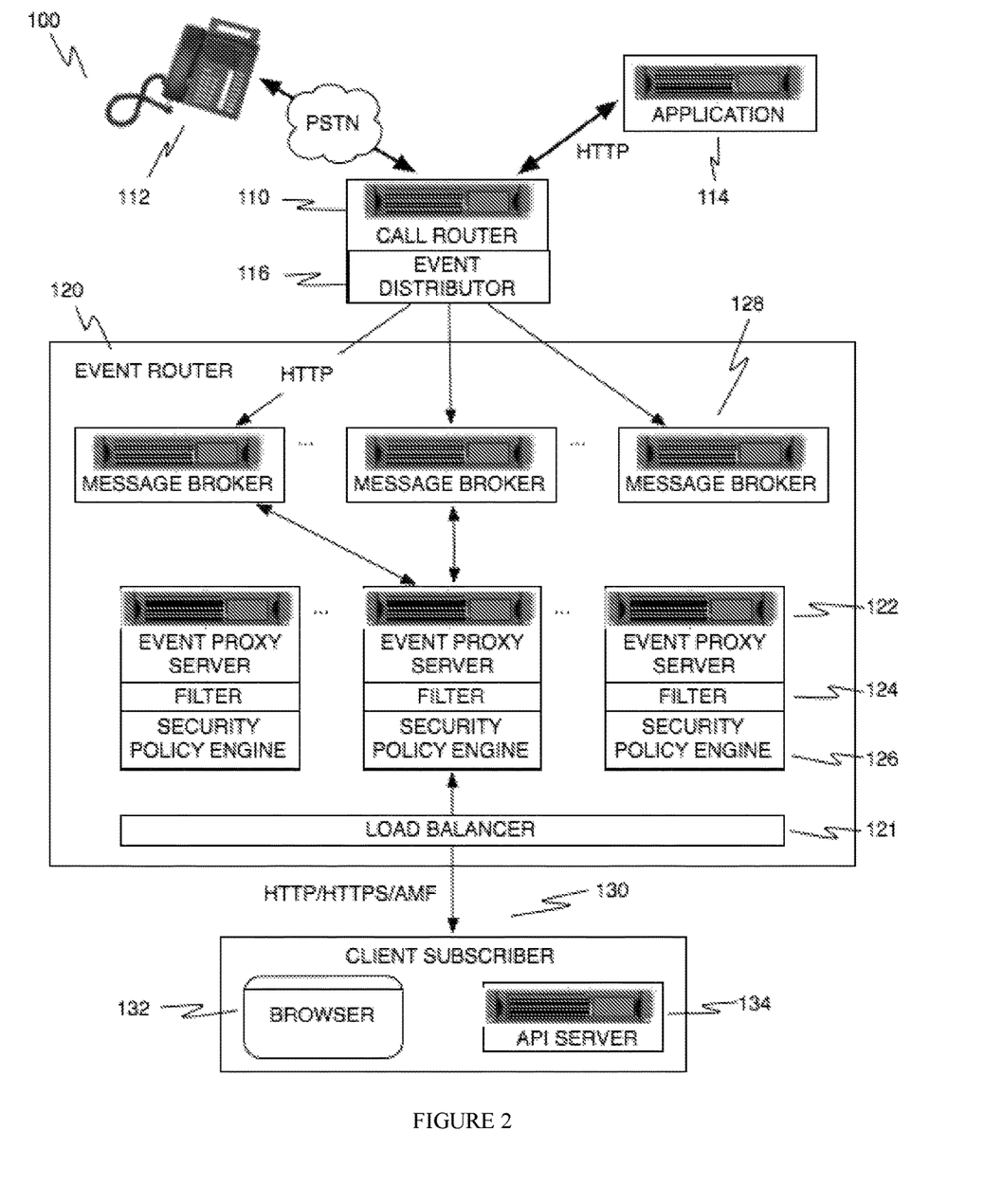
FIG. 2 is a detailed schematic diagram of the preferred embodiment of the invention.
Figure 3:
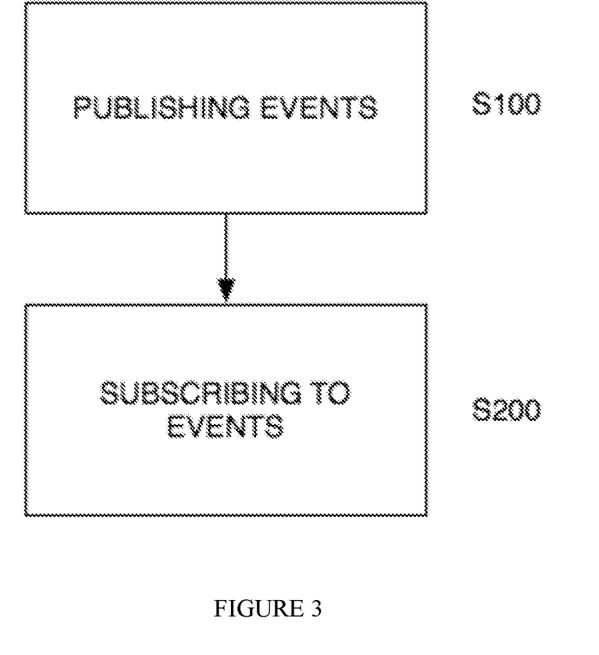
FIG. 3 is a flowchart diagram of a preferred method of event subscription for telephony applications.
Figure 4:
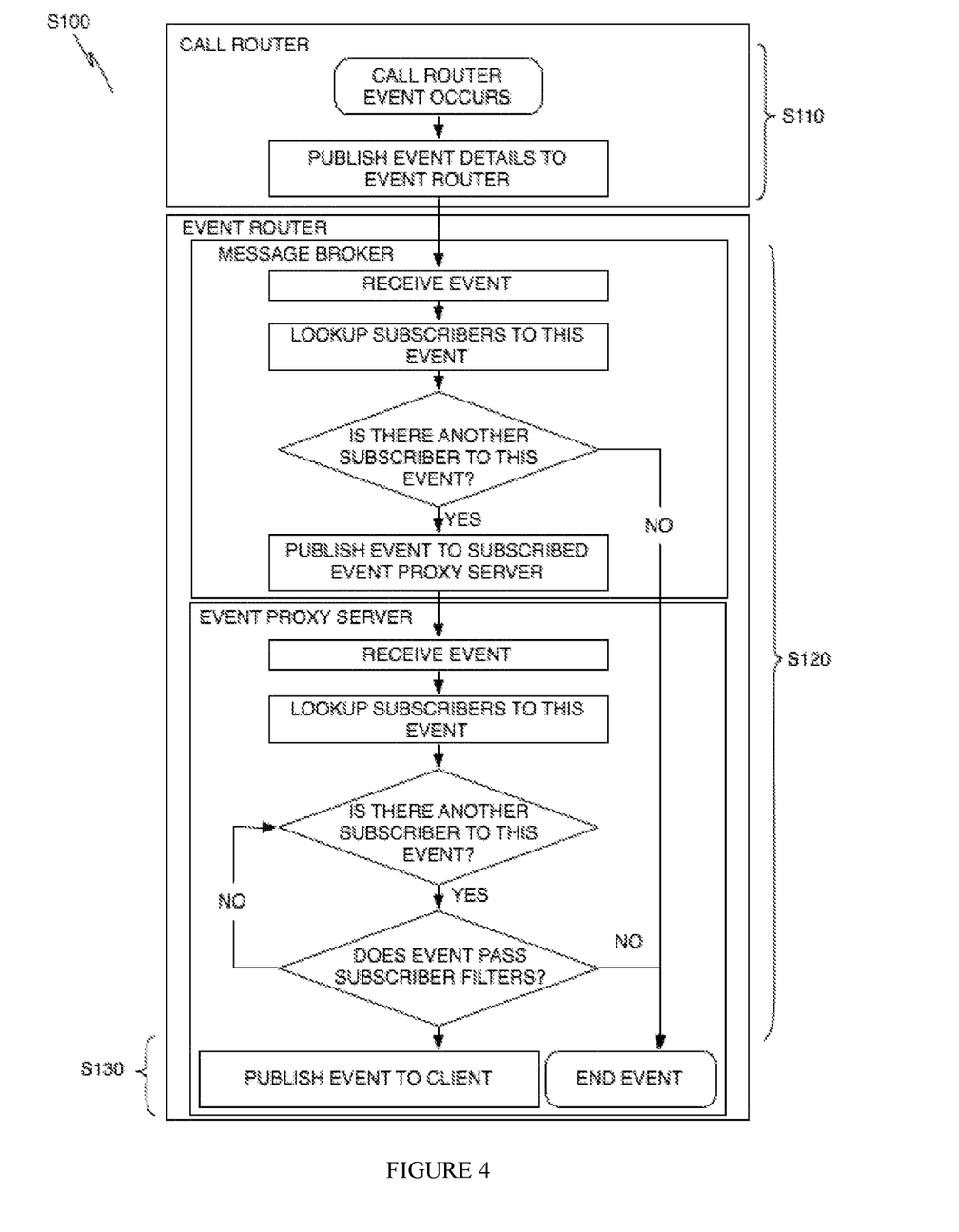
FIG. 4 is a flowchart diagram of a preferred method of distributing events.
Figure 5:
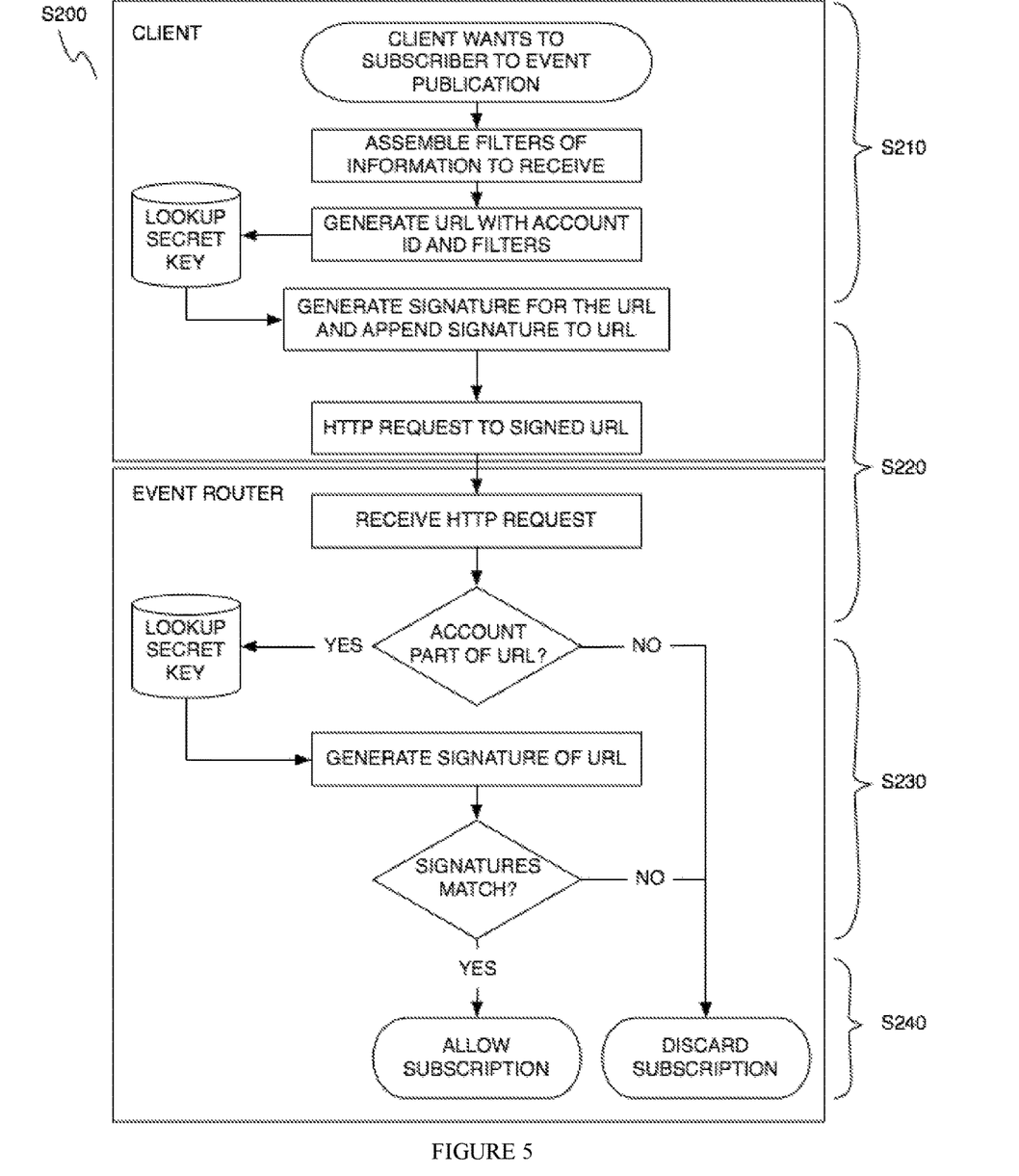
FIG. 5 is a flowchart diagram of a preferred method of subscribing to events.
Figure 6:
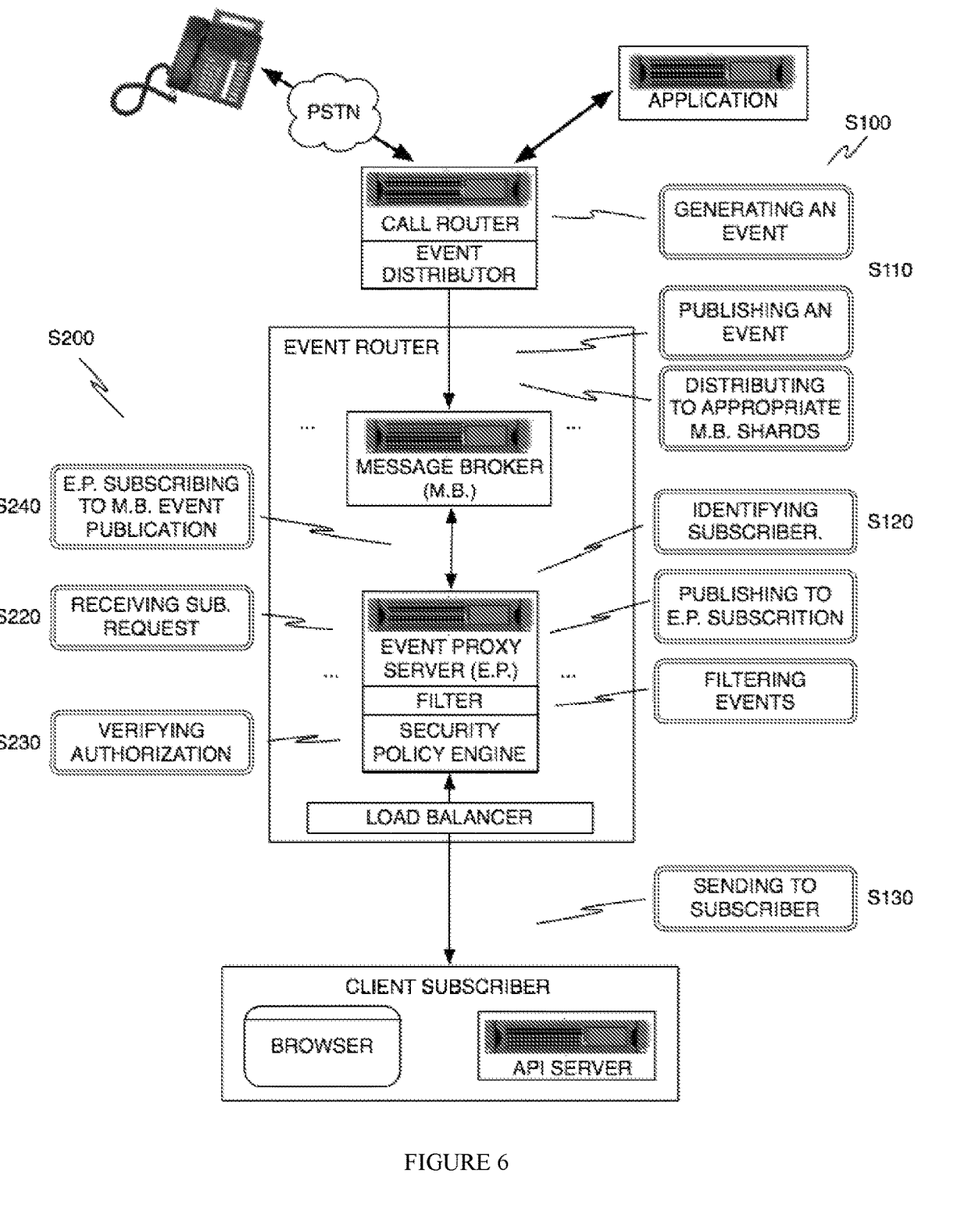
FIG. 6 is a flowchart diagram of a preferred method of subscribing and publishing events.

As shown in FIGS. 1 and 2, the telephony web event system 100 of the preferred embodiment includes a call router 110 and an event router 120. The system functions to enable real-time telephony event interaction. In the preferred system, telephony events (e.g., a dialing sequence, a speech command, and a phone call termination) are sent out by a publisher (a device that prepares and electronically announces the occurrence of an event, preferably a call router) and received by a subscriber. A subscriber is preferably any client 130, such as a web browser 132 or Application Programming Interface (API) server 134 that has permission to receive information concerning a particular event. The system 100 is preferably implemented on a multitennant system where a plurality of applications and users are handled on the same software or hardware system. In particular, the call router can preferably simultaneously manage a plurality of telephony application and the event router can publish a plurality of events and manage a plurality of subscriptions for a plurality of clients. The components of the system are preferably scalable with respect to the number of accounts, in-progress calls, events on those calls, and the number of client subscriptions. Call routers 110, event routers 120, or any sub-elements (such as event proxy servers 122 or message brokers 128) may be allocated or deallocated to automatically adjust for capacity requirements. A load balancer 121 may additionally be included to optimize the operation of the system components.

The call router 110 of the preferred embodiment functions to initiate the publication of events occurring during a telephony application. The telephony application is preferably a program controlling the interaction between a telephony based device 112 and an internet based web application server 114. The call router 110 preferably controls the call and program logic that enables telephony devices 112 to interface with the application server 114, as discussed in more detail below. The call router 110 preferably detects events occurring from the telephony application 114 and publishes these events to the event router 120. The call router may additionally include an event distributor 116 that determines to which event router to deliver the event. In one variation, the event router 120 includes a plurality of message brokers 128 that manage the publication of events. The message brokers 128 may be sharded or arranged according to event type or any suitable arrangement. The event distributor 116 preferably has control logic to know the correct message broker 128 to send an event. The control logic is preferably updated or synched with the scaling of hardware or software resources of the event router. As an example, an event may have varying attributes, such as account ID, a call ID, or event type. The message brokers 128 may be sharded based on any of these attributes or any combination of attributes. For example, if there are 3 event routers (shards), then the call router could convert the call ID into an integer and that number modulo 3 to determine which event router to contact. An event proxy server 122 may additionally share this control logic such that the event proxy server 122 knows which message broker(s) 128 to subscribe to. The event proxy server 122 preferably uses a similar technique to determine which event router 120 to contact based on what attributes where subscribed to. Additionally an event may be distributed (published) to multiple message brokers 128, such as in the situation where an event has attributes that are managed by multiple message brokers 128. For example, the event may be published by one message broker 128 that manages publication of events for a particular account and the event may additionally be published by a second message broker 128 that manages publication of events of a particular event type. Additionally, multiple event distributor 116 may be allocated or deallocated. The call router and the event router preferably communicate using HTTP or alternatively HTTPS, though any suitable communication system may be used. The published event preferably includes the account to which the event belongs, the type of event, and optionally a set of event data related to the event.

Figure 8A:
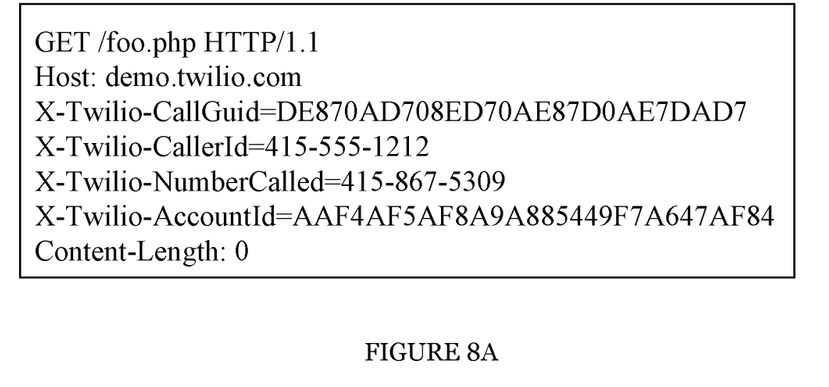
FIGS. 8A-8C are examples of a HTTP GET request, a HTTP POST request, and a HTTP GET request, respectively.
Figure 8B:
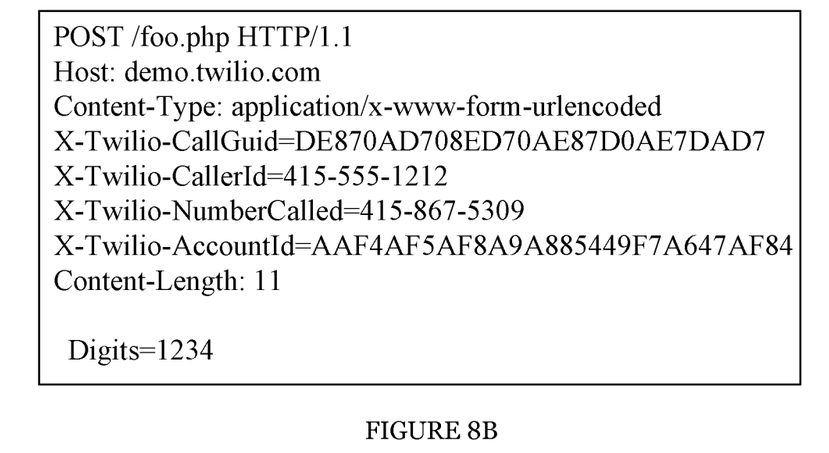
Figure 8C:
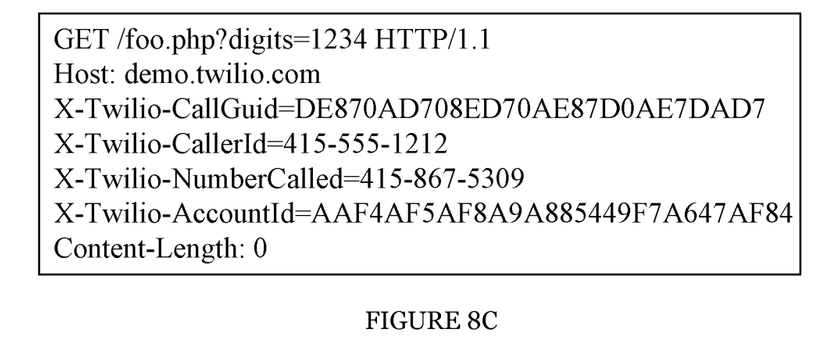
Figure 8D:
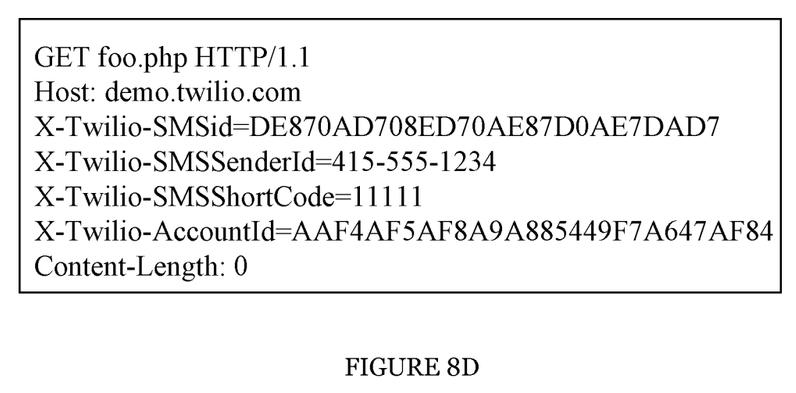
FIGS. 8D-8F are examples of a HTTP requests.
Figure 8E:
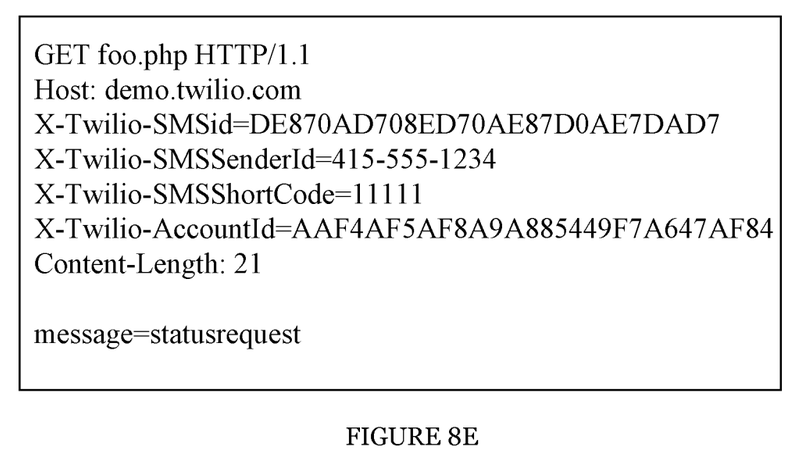
Figure 8F:
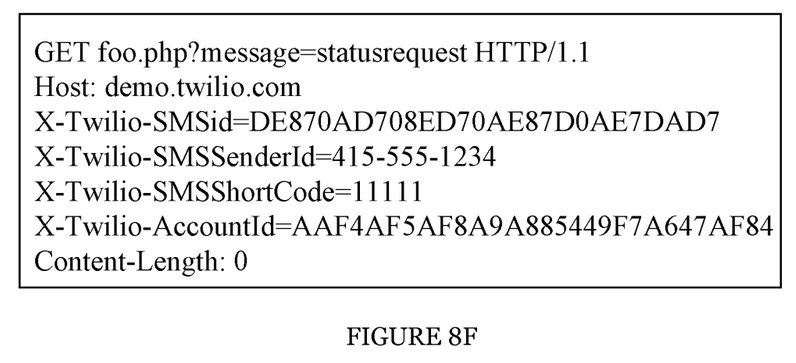

The call router 110 of the preferred embodiment additionally functions to initiate or receive calls from the telephony device 112 and connect to a web-application server 114. The call router 110 is substantially similar to the call router disclosed in application Ser. No. 12/417,630 filed on 2 Apr. 2009 and entitled "System and Method for Processing Telephony Sessions" which is hereby incorporated in its entirety by this reference. The call router 110 is preferably connected to a PSTN device over the PSTN network, such that it can receive and make calls from PSTN-connected devices 112, such as landlines, cellular phones, satellite phones, or any other suitable PSTN-connected devices, as well as non-PSTN devices, such as Voice-Over-Internet-Protocol (VOIP) phones, SIP devices, Skype, Gtalk, or other Internet addressable voice devices. The call router 110 may alternatively or additionally function as or include a message router for use with message-based networks such as SMS, email, faxes, instant messaging, or micro-blogging networks. The call router 110 can preferably connect to an SMS network, such that it can receive and send messages from SMS network devices 112, cellular phones, computers, smart phones, or any suitable SMS network devices. The call router 110 may also send or receive text messages, multimedia messages, emails, faxes and other suitable PSTN-compatible communication messages. The call router 110 can preferably connect to an instance messaging network, such that the call router 110 can receive and send messages and receive and transmit presence information from different instance messages networks such as those based on protocols like Jabber, AIM, or fax. The call router 110 can preferably connect to micro-blogging networks such as Twitter such that it can receive and send messages to and from micro-blogging networks via APIs exposed by those networks. The call router 110 may alternatively send and receive message from any suitable system with exposed APIs. The call router 110 preferably communicates with the application server 114 using an application layer protocol, more preferably using the HTTP, or secure HTTPS, protocol. The communication between the application server 114 and the call router 110 is preferably stateless and any state information (e.g., call state) or data is preferably located in a URI or the request parameters, such as HTTP headers, GET URI parameters, POST request body parameters, or HTTP cookies. Available state information is preferably transmitted by call router requests to the application server for stateless processing, and the application server preferably stores no state. Alternatively, the application server preferably stores local state information, such as databases or sessions, as is common in web development. The call router no preferably stores state information in call router resources 29. The call router resources are preferably accessible by the application server 114 and other devices through a call router API. The call router 110 preferably associates each incoming phone number with a starting resource address (or more specifically a URI), more preferably the URI is provided by the application server 114, still more preferably the URI is provided by the application developer before a call is received at the call router 110 by associating the initial URI with the incoming call address (such as DID, SIP address, etc.) or by the application upon initiation of an outgoing call. The call router 110 preferably sends call data such as the caller number (obtained via Caller ID), caller geographic data (country, city, and/or state, zip), the number dialed, the time of the call, or any other suitable information or parameter. The call data is preferably digitally signed with a secret key stored on the call router 110. A cryptographic hash of the information is preferably included along with the information as a digital signature. The call router 110 may also encrypt sensitive information (either before or after the cryptographic hash is computed) using the secret key to allow sensitive information to be sent across the network. The call data is preferably sent as an HTTP POST request to the application server 114. Call data may also be sent in URL (GET) variables, or encapsulated in HTTP headers. An example HTTP request containing the information in the header as shown in FIGS. 8A and 8D. As shown in FIG. 8B, further inputs (such as voice recording or DTMF button pressing) from the PSTN-device may be subsequently submitted to the application server 114 as HTTP requests (GET or POST). As shown in FIG. 8C, the inputs from a phone keypad may be included in an HTTP GET request. As shown in FIG. 8E, the content of an SMS message received by the call router may be sent to the application server 114 as an HTTP request. As shown in FIG. 8F, the inputs from the text message are included in an HTTP GET request. The request data may alternatively be simultaneously sent in the URI (query string), message body (POST) and message headers, or any combination of the above.

Any suitable action or parameter, either initiated by the telephony device 112 or by the application server 114, may constitute an event generated by the call router 110. The call router 110 preferably automatically detects such events through any suitable program logic. Events may relate to call related events such as starting or ending a call, starting or ending dialing a number, or any call based occurrence. The events may additionally or alternatively be related to telephony actions such as starting or stopping recording audio, starting or stopping a Text-To-Speech (TTS) conversion, starting or stopping the playing of an audio file, beginning or stopping the gathering of telephony input, redirecting the call to another phone number, or any telephony based instruction. Events may additionally be adjusted for particular applications such as conference calls. Conference call events might include a participant joining a call, a participant leaving a call, gathering telephony input, participant muted, participant unmated, or any suitable conference based event. Furthermore, events may be generated for actions that occur on the message-based protocols used by the call router 110. For example, an messaging events might include a message sent, message received, and message error for SMS, email, faxes, instant messaging, or micro-blogging messages.

The event router 120 of the preferred embodiment functions to connect published events with subscribers of the event. Preferably, the published event is pushed to subscribers through an open HTTP connection (a single continuous HTTP connection). The open HTTP connection functions to simplify software of a web application using the system. Alternatively, the connection may push data with HTTPS, intermittent HTTP/HTTPS connections, AMF Channel, TCP connection, UDP connection, chat protocols such as jabber, or any suitable messaging framework. The event router is preferably a server, which may be partitioned and scaled for greater capacity. The event router 120 may alternatively be a monolithic system or any suitable software or hardware device(s) for routing events between any number of event publishers and authorized subscribers. In one preferred embodiment, the event router includes an event proxy server 122 and/or a message broker 128. The event proxy server 122 preferably manages the subscriptions from a client (i.e., subscriber) and/or performs more computational intensive processes like filtering events and security. The message broker 128 preferably manages the publications and more preferably manages a subset of event publications from the call router. The event proxy server 122 is preferably part of a cluster of event proxy servers 122 that can be dynamically scaled to satisfy capacity requirements. The message broker 128 is preferably part of a cluster of message brokers 128 that can similarly be dynamically scaled to satisfy capacity requirements. A load balancer may additionally be included within the event router 120 to manage the capacity load of the various components (e.g., the event proxy servers 122 and the message brokers 128). A plurality of load balancers may be individually implemented for each component type, or a single load balancer may manage the event router 120.

The message broker 128 of the event router 120 functions to manage the publication of events. The message broker 116 (or core message distributor) preferably handles routing of events to be published. A message broker is preferably any message broker as is known in the art such as RabbitMQ or other Advanced Message Queuing Protocol (AMQP) based broker. Preferably, a plurality of message brokers 128 is used to manage the events. More preferably message brokers 128 are sharded (i.e., partitioned) according to dedicated event types (or group of event types). Events are preferably distributed to the appropriate message broker 128 based on the event type. The sharding of message brokers may alternatively be according to any suitable rule. The message brokers 128 (i.e., the shards) may additionally be hosted on different hardware or software platforms, and event type responsibilities may be adjusted when additional message brokers 128 are allocated or deallocated from the cluster of message brokers 128. The message broker 128 may alternatively be a single device for all published events or hosted on a single system. A message broker 128 preferably sends events to an event proxy server 122 that is subscribed to a particular event. A message broker 128 may additionally send an event for any number of subscriptions, where the subscriptions are managed by any suitable number of event proxy servers 122.

Figure 10:
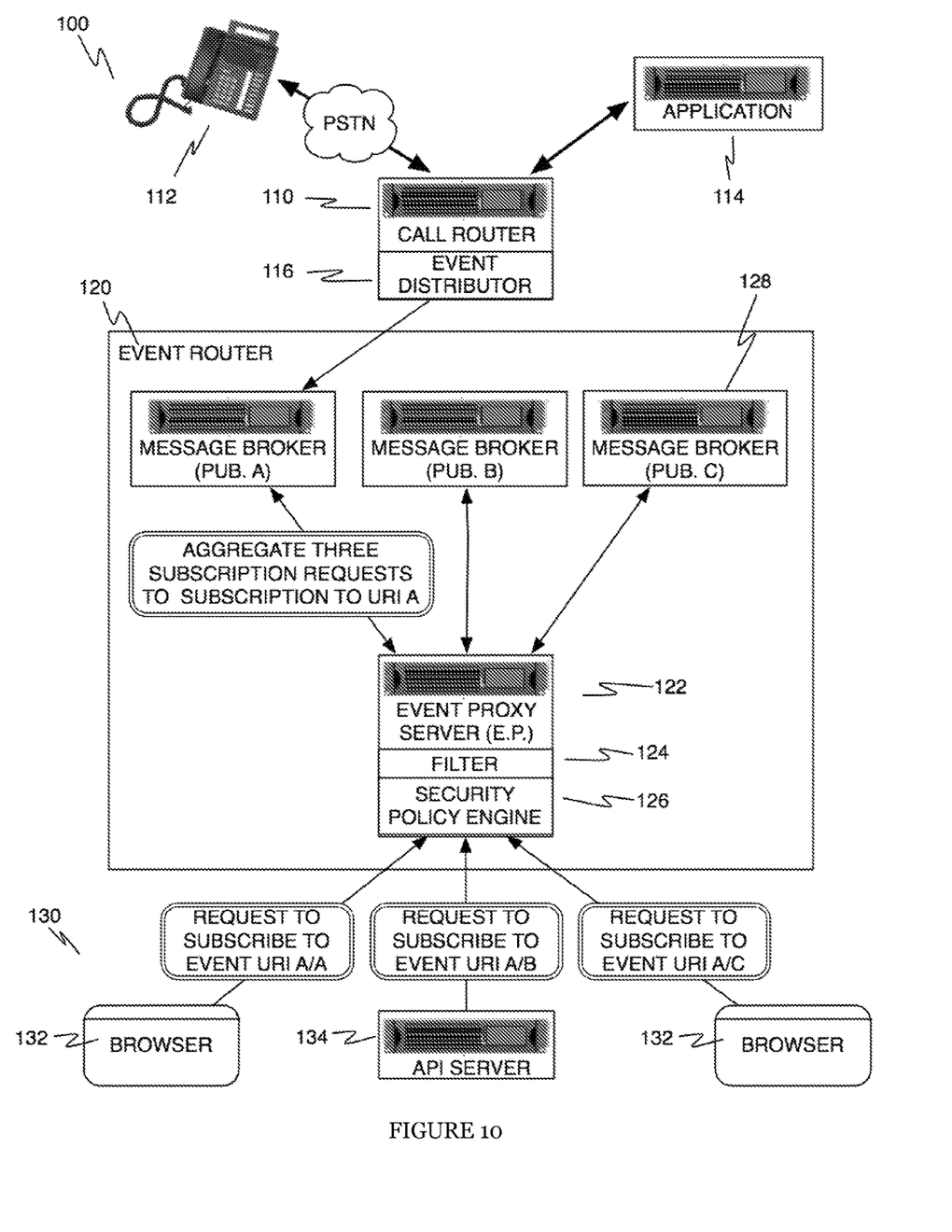
FIG. 10 an example of subscription aggregation.

The event proxy server 122 of the event router 120 functions to manage the subscriptions of clients. The client preferably connects to the event proxy server 122 for establishing a subscription to an event and to receive notification of events being published through the event router 120. Events published by a message broker 128 are preferably distributed to a subscribed event proxy server 122, and the event proxy server 122 preferably sends the event to a client. The event proxy server 122 is preferably part of a plurality of event proxy servers 122 that can be automatically scaled. Additionally, an event proxy server preferably manages multiple subscriptions, and may subscribe to multiple message brokers 128. Additionally, a plurality (or series) of event proxy servers 122 may be connected to a single message broker 128 or any suitable device publishing the event for the event router 120. The plurality of event proxy servers 122 functions to increase the volume of subscriptions the event router 120 can manage. A plurality of event proxy servers 122 may alternatively be used with a partitioned message broker 128, multiple message brokers 128, or any suitable configuration. As another variation, an event proxy may have multiple subscriptions (e.g., for different clients) to a message broker 128. This multiple subscriptions may have redundancies. The event proxy server 122 may aggregate the subscriptions for improved system efficiency, as shown in FIG. 10. The event distributor 116, the message brokers 128, and the proxy servers 122 cooperate to increase the subscription capabilities of the event router. The event proxy server 122 additionally functions to perform resource intensive processes such as running an event filter or security policy engine. The event proxy server 122 is preferably a dedicated server for handling event filtering, operating the security policy engine, and/or any suitable CPU intensive tasks.

The event router 120 of the preferred embodiment may additionally include an event filter 124 that functions to selectively pass events to a client. The event filter 124 is preferably operated on an event proxy server 122. Event filters 124 selectively filter the number of events published to a particular subscriber based on account security, event type, contents, and/or any suitable parameter of the event. When a subscriber issues a subscription request, the request preferably contains a set of credentials and more preferably a set of event filters. The event router 120, more preferably the event proxy server 122, first verifies the account ownership via the credentials to determine if the subscriber is authorized to view events for the given account. Once a subscriber's identity is determined, the event router only passes events that are associated with authorized accounts. Preferably, this account-level security preferably limits visibility of events to only the relevant account or accounts, and the event filters are preferably applied after the account-level security. The event proxy server 122 preferably applies the event filters 124 to determine if the event router should publish an event to a given subscriber. The event filter 124 is preferably a type filter or a parameter filter. A type filter preferably filters event details by the type of event such as 'call start', 'call end', 'call error', 'call warning', 'record start', 'record end', 'gather start', 'gather end', 'dial start', 'dial end' and/or any suitable type of event. A parameter filter preferably filters events based on characteristics of the event such as by caller ID, contents of call, time of call, duration of call, area code of call, and/or any suitable characteristic of a call. A parameter filter may additionally filter based on the event (such as which digit was pressed by the caller, the warning message issued by the call router, or the length of a recording). Event filters 124 may be used in a variety of ways. As one example, filters may be configured to subscribe to a particular call. As another example, the filters may be configured to subscribe to all calls to and/or from a given phone number. As yet another example, the filters may be configured to subscribe to a particular telephony application action such as "call start" across an account (which may involve multiple simultaneous calls for various phone numbers). The event filter 124 may additionally function to provide a level of security. The event filter 124 preferably prevents inspection, observation, receiving, and/or gathering of any useful information concerning a subset of events. A publisher may implement a security event filter 124 for events the publisher does not want a subscriber to see or alternatively, any suitable entity may implement a security event filter 124.

The event router 120 of the preferred embodiment may additionally include a security policy engine 126 that functions to enforce a security policy governing which subscribers are allowed to subscribe to a particular event. The event proxy server 122 preferably operates the security policy engine 126. Preferably, the security policy engine 126 includes a signed URL. The signed URL is preferably composed of a subscription message and a verification token. The verification token functions to be validation of the authenticity of the subscription request. A private key shared between the client application developer and the event router is preferably used to generate the verification token and is preferably a code, password, or any suitable identifier. The verification token is preferably implemented as an HMAC (Hash Message Authentication Code) hash using the key, but may alternatively be implemented by any suitable cryptographic message authentication technique. The verification token preferably includes the subscription request including a subscription URL, subscription filters, subscription expiration time, and/or any other suitable subscription metadata or parameter. The verification token is preferably attached to the subscription request. In one preferred version, the verification token is appended to the end of a URL of the subscription message to form the signed URL. The signed URL allows the subscription request to be passed to unknown devices, such as a remote web browser, and allowing the browser to issue subscription requests without knowing the key or other information. Alternatively, other security systems such as OAuth URL signing or any suitable security method may be implemented.

The system of the preferred embodiment may also include a connection to the client device 130, which functions to be a channel through which published events that a client subscribes to can be delivered. The connection 130 is preferably any suitable network connection either wired or wireless. The connection 130 is preferably between an event router 120 and the client, and more preferably, the connection 130 is between an event proxy server 122 and the client. The connection to the client is preferably an HTTP connection but may be any suitable signaling protocol. The client device of the preferred embodiment functions to provide interaction with subscribed events. The client device may be a front-end interface of the web application. The client device preferably reacts to events and provides an interface for user interaction. The client device may be a website, a computer program, a web enabled consumer product, a server, or any suitable device. However, the client device may alternatively be a backend system such as a data collection system. A browser 132 is one common type of client. A connection with a browser is preferably implemented via Ajax in javascript (e.g., XMLHttpRequest) or via a flash plugin (e.g., XMLSocket or an AMF or SecureAMF channel). An Application Programming Interface (API) server 134 is a second common type of client. A client preferably initiates the creation of connection 130 to the event router 122. However, in the situation of an API server 134, the event router 120 or, more preferably, an event proxy server 122 may initiate the creation of a connection 130 to the client 130. There may additionally be a control channel and a publication channel. The control channel is a connection through which a client submits a subscription request. The client can manage subscriptions through the control channel. Management of subscription includes modifying an existing subscription (e.g., updating filters or changing expiration time), adding a subscription, deleting a subscription and/or any suitable subscription change. The subscription channel is the connection through which events are sent to the client. In one variation, a client may setup multiple subscriptions and/or modify subscriptions through multiple control channels or alternatively through one control channel at different times. One publication channel is preferably used regardless of the number of subscriptions of a client. This functions to reduce the number of open connection 130 between the client and the event proxy server 122. The connection 130 may be any suitable connection as mentioned above. In the case where the connection is a long poling type connection, a client preferably connects to the event proxy server 122, gets an event, and closes a connection. When the client is not connected, events may be missed by the client. The event proxy server 122 preferably includes a cache to store events (up to an expiration time) and delivers the cached events to the client during the next connection with the client.

The application server 114 of the preferred embodiment functions to provide a web developer with an improved development environment for interfacing and designing interactions for communications applications. The call router 110 preferably manages the interaction between the telephony device(s) 112 and the application server 114. Events are preferably generated by this interaction. The web application (application server) is preferably a website, but may alternatively be a computer program, a web enabled consumer product, or any suitable method or device capable of event subscription tasks. The application server 114 preferably combines telephony actions and a website to form a powerful user experience. In one example of an application server 114, a user may enter a phone number and leave audio comments for individual photos as the photos cycle through a slideshow. In a second example, a conference call can be managed through a web interface. In a third example, a customer service phone call may be managed and annotated using a web interface. In a fourth example, a business or sales phone call may be managed and supported by using a web interface. Any suitable application server utilizing telephony interaction may alternatively be used. The web application is preferably programmed in a manner similar to regular websites, but integration into the system allows for new user experiences relying on telephony actions.

The application server 114 functions to provide data processing logic for requests received from the call router 110. The application server 114 is preferably connected to the call router 110 via a network 24, more preferably via the Internet. The application server 114 is preferably a third party server operated outside of the system, but the system may alternatively include the application server 114. A URI is preferably associated with an application server 114 or an application on an application server 114. The application server 114 preferably communicates with the call router 110 using an application layer protocol, more preferably using the HTTP protocol, or more secure HTTPS protocol. The application server 114 preferably receives HTTP requests from and sends HTTP responses to the call router 110. The application server 114 preferably runs on a standard stack of programming languages, hosting providers, operating systems and databases to handle HTTP requests, as if the caller were a website visitor in a web browser. The application server 114 also preferably verifies the digital signatures of the call data received in the requests using the secret key to compute a cryptographic hash from the received information and the hash received. If the computed hash and the received hash do not match, or no hash is received with the request, then the application server 114 preferably determines the request is fraudulent, and the request is preferably discarded. If the computed hash and received hash match, the application server 114 preferably determines that the request is authentic and proceeds further with the processing of the request. The application server may alternatively choose to ignore the hash if security is not important. The application server preferably uses call state data communicated by the call router request to determine the next call router instructions, without requiring call state stored on the application server. The application server may alternatively use call state data sent by the call router, such as the caller ID of the caller or the unique ID of the call, to reference additional or external state data, such as rows in a database or session data stored on the application server.

Figure 9A:
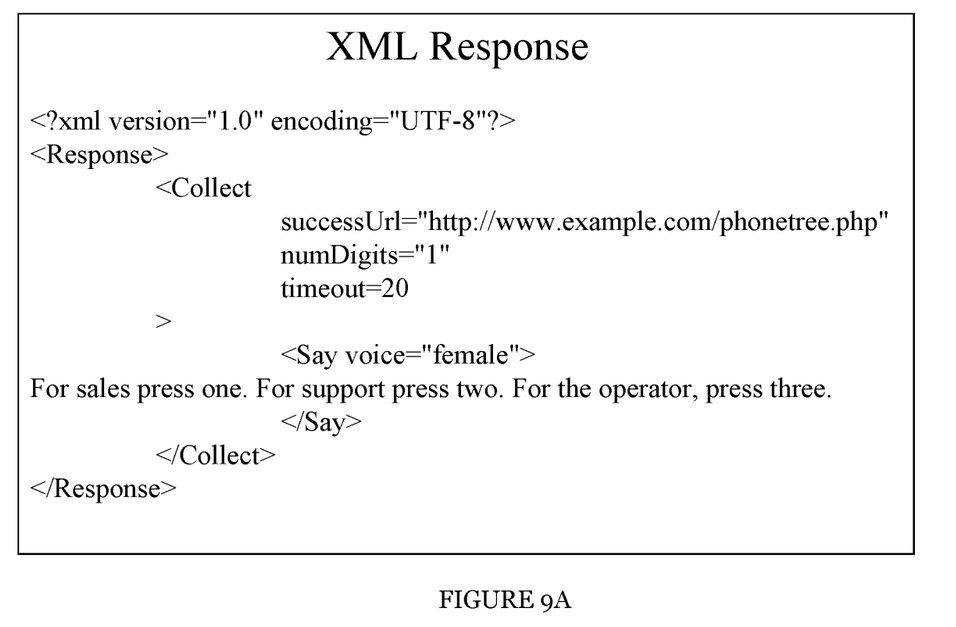
FIGS. 9A and 9B are examples of XML responses.
Figure 9B:
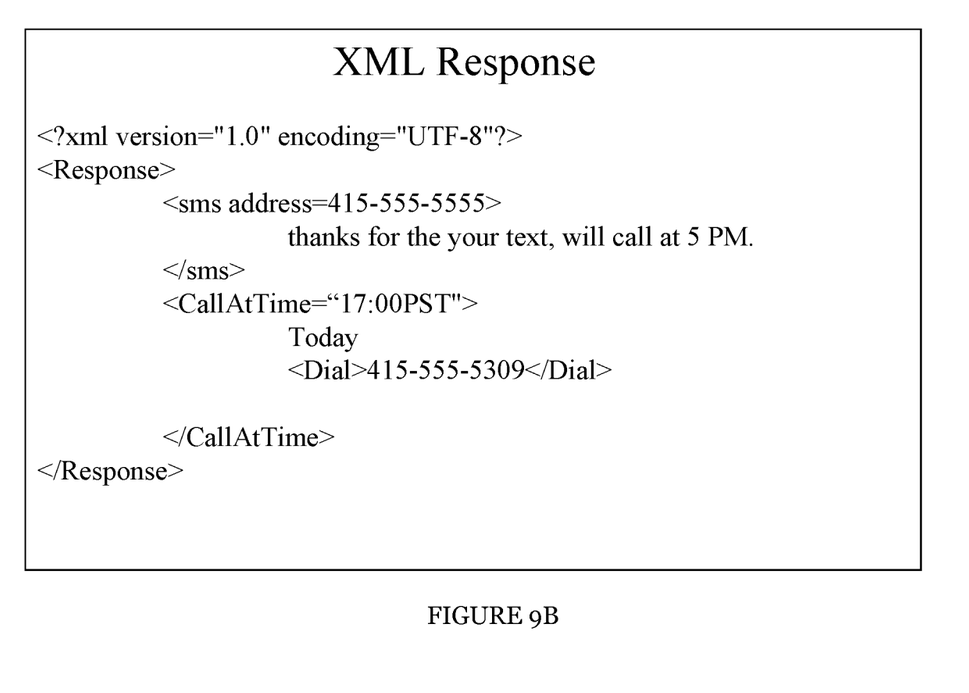

The application server 114 preferably responds to HTTP requests received from the call router 110 by generating telephony instructions for the call router 110. Telephony instructions when executed by the call router preferably cause an event to be detected by the call router 110. The application server preferably replies to the call router in XML, however, any suitable machine-readable message format may be used, including HTML, key/value pair text, delimited text or binary encoding. The XML preferably includes the telephony instructions for the call router 110 such as connecting to another number, playing a recorded greeting, reading text, and/or requesting DTMF digit entry from the caller. The telephony instruction may alternatively be related to SMS messaging, Multimedia Messaging Service (MMS) messaging, faxes, instant messages, email, micro-blogging, or any suitable messaging task. The telephony instruction may additionally be used to send an outgoing SMS message, arrange a phone call from a specific phone number, arranging for a callback, setting up a conference call (connecting multiple numbers), sending an email, interfacing with a calendar or scheduling system, purchasing goods, or services, or any other suitable instruction. The XML instructions are preferably a set of commands to be executed in order, one at a time (i.e., sequentially). An example XML response is shown in FIGS. 9A and 9B. In single telephony session (e.g. one initiated by a PSTN-device or an SMS device), a response from an application server can initiate an outgoing telephony call and/or a SMS message. That is, a single XML response preferably provides the ability to interact with both the SMS network and the voice telephony network (PSTN, SIP/VoIP, etc) sequentially or simultaneously. In addition, audio or video files sent to the call router 110 can be converted to text by an automatic speech-to-text engine, human or other technique, and sent back in text form as an SMS message or an attachment to an MMS. In one variation, an application running on a server may be a simple static XML page and static sound files, deployed on basic web servers where no development or scripting environment is available. This variation preferably uses URI Templates (a current IETF proposal for HTML5), which essentially includes URLs with placeholders for variable data, like this: http://www.twilio.com/audio/{Digit}.mp3 where the call router 110 would substitute the digits pressed for the {Digit} placeholder in the URI Template, GET the file at the resulting URI, and play the static sound file in response. This allows an entire application to be authored offline in a What-You-See-Is-What-You-Get (WYSIWYG) html editor. For example, if the server response specifies the URI Template: http://demo.twilio.com/myapp/{Digits}.mp3, and the caller presses digits 1234, the call router 110 would GET the static mp3 file located at: http://demo.twilio.com/myapp/1234.mp3 and play it to the caller. The variables used for substitution in the URI Templates preferably correspond to the names of variables defined for state submission in HTTP GET, POST and/or header requests from the call router. From the previous example, {Digits} would be associated with a parameter named "Digits" that is preferably generated as a result of a "gather" telephony instruction (collection of DTMF digits). In the preferred embodiment for the second configuration, the call is initiated by the application server 114 (through the call router 110), and the second configuration is substantially similar to the first configuration, such that the call routing is preferably handled identically to an incoming call, namely via URI requests from call router 110 to the server 114 upon call state changes.

Figure 7:
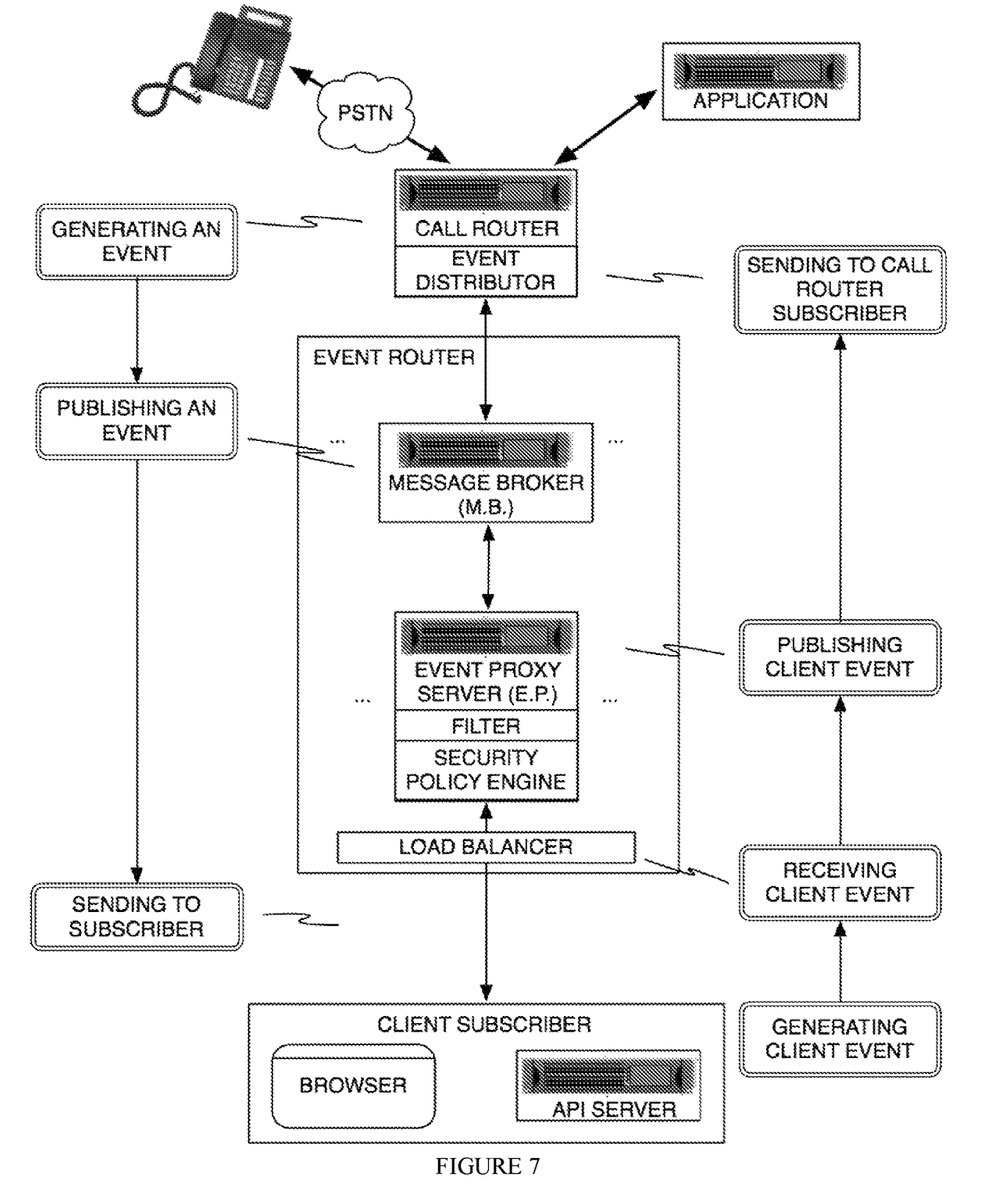
FIG. 7 is a flowchart diagram of a preferred method full duplex publishing and subscribing of events.

As an additional alternative, the system may be implemented to be full duplex where events (client events) may additionally be published from a client and the call router can subscribe to the client events as shown in FIG. 7. In this alternative, the event router additionally manages the publication of client events and manages call router subscriptions to client events. The system is preferably implemented in substantially the same way as above, but with the client additionally generating events and the call router subscribing to events. The client event system is preferably integrated with the eventing system described above.

2. Telephony Web Event Method

As shown in FIGS. 3-6, the method of event subscription for telephony applications includes distributing events S100 and subscribing to events S200. Distributing events preferably includes the sub-steps publishing an event to a router S110, identifying subscribers to an event S120, and sending an event to a subscriber S130. Subscribing to events includes the sub-steps of generating a signed URL for an event subscription S210, sending an event subscription request to an event router S220, verifying an event subscription S230, and allowing an event subscription S240. The method may additionally include allocating new resources to the event router. In particular event proxy servers and message brokers may be allocated or deallocated. Additionally, call routers, event distributors, and/or any suitable part device of the system may be allocated or scaled to accommodate capacity needs. A load balancer may additionally distribute processing across the plurality of components.

As an alternative, the method may additionally include receiving a subscriber generated client event, publishing the client event to the event router and identifying a call router subscribed to a client event, and sending the client event to the call router. This functions to make the eventing method full duplex for two way event publication and subscription. The duplex eventing system is substantially similar to the eventing system described, but where the client generates the events and the call router is subscribed to the events.

2A. Method of Publishing an Event

Step S110, which includes publishing an event to a router, functions to initiate the announcement of an event. Event details are preferably sent to an event router at a URL or other suitable resource or connection identifier. Event details preferably include account identification, event type, any event data associated with the event, and any other suitable parameters relating to the event. Publishing to a router preferably occurs after a new event occurs, but alternatively, a batch of events may be published periodically, a batch of events may be published when an event count is satisfied, an event may be published when an event type is satisfied, or any suitable event publishing rule may be applied. An event is preferably generated from a telephony application operating on a call router. The telephony application is preferably substantially similar in functionality to the one described above. A call router preferably publishes an event to an event router. The event is preferably published over HTTP, but any suitable protocol may be used. An event distributor may additionally select a message broker to send the event. A plurality of message brokers may be sharded according to event types and the event distributor preferably is capable of mapping the event to the appropriate message broker.

Step S120, which includes identifying subscribers to an event, functions to identify all authorized subscribers that should be notified that the event occurred. The subscribers are preferably associated with a subscription URL. Any suitable number of subscribers is preferably identified, and subscribers are preferably identified by inspecting a list of subscribers. The subscribers may alternatively be associated with a group of other subscribers, and a group (or groups) may be identified as a subscriber. Identifying subscribers is preferably performed by an event router, and more preferably an event proxy server in cooperation with a message broker, though any suitable device may be used. Preferably, an event proxy server performs the steps of managing a subscription of a client (subscriber) and subscribing to an event publication of the event router. The event proxy server preferably subscribes on behalf of a client, so that subscription processing can be delegated to the event proxy server. More preferably a message broker performs the steps of publishing the event. So that the event proxy server subscribes to a message broker. Identifying subscribers of an event may include a sub-step of verifying event filters. An account-level security may additionally be enforced by the event router to limit the visibility of events to only relevant accounts. The event is compared to filters of a subscriber to ensure the subscriber should be sent the event. The filters are preferably type filters or parameter filters as discussed above.

Step S130, which includes publishing an event to a subscriber, functions to notify a subscriber of the occurrence of an event. The event is preferably published by an event router over an open HTTP connection, but alternatively, a periodic HTTP connection, messaging framework such as Jabber, or any suitable communication protocol may be used. In the situation where a client has previously broken a connection with the event router (i.e., is not connected to the event router at the time an event occurs), the event proxy server preferably establishes a connection to the subscriber. The event proxy server preferably establishes the connection by accessing the stored address of the client and connecting through any suitable protocol. In the case the subscriber is an API server, an API command may be used to connect or notify the API server of the event.

2B. A Method of Subscribing to an Event

Step S210, which includes generating a signed URL for an event subscription, functions to generate a URL encoding any subscription URL, filter, and/or identification information. An unsigned URL is preferably generated including account identification, subscription URL, subscription filters, subscription expiration time, and/or any other suitable subscription metadata or parameter. Preferably, a key is looked up based on the account identification. The key is used to create a verification token. The verification token is preferably implemented as an HMAC-SHA1 (Hash Message Authentication Code) hash using the key or any suitable another cryptographic message authentication technique may be used. The verification token additionally includes the subscription request including a subscription URL, subscription filters, subscription expiration time, and/or any other suitable subscription metadata or parameter. The verification token is preferably appended to the unsigned URL to form a signed URL. The signed URL is preferably integrated into a subscription request. The subscription request is preferably a request to receive particular events of a telephony application.

Step S220 includes sending a subscription request to an event router. The subscription request is preferably sent to an event router by HTTP protocol, but any suitable protocol may alternatively be used. The subscription request is preferably received by an event router, and more preferably is received by an event proxy server. The event proxy server preferably manages subscriptions.

Step S230, which includes verifying an event subscription, functions to verify the identity of a subscriber. The signed URL of the event is preferably deconstructed to identify account identification, subscription URL, subscription filters, subscription expiration time, and/or any other suitable subscription metadata or parameter. The event router preferably verifies that the account identification is included in the signed URL or other authentication credentials. If no account identification is found, the subscription request is discarded and an error is returned. If the identification information is included a key for the account is looked up (i.e. found in a database). The key is preferably a shared key that is identical to the key of Step S210. The key is then used to form a verification token. The verification token is preferably a HMAC hash, or alternatively any suitable cryptographic message or identifier. The verification token is compared to the verification token from the signed URL to verify the match.

Step S240, which includes allowing an event subscription, functions to allow a client to subscribe to an event. A subscription preferably allows a client to receive events in real time (approximately a few milliseconds to a few seconds). An event subscription also only allows events that are authorized to be viewed by the account, such as events generated by calls on that account. More preferably, the events preferably pass any filters of a subscriber. As an additional alternative, subscriptions may expire after a given time. As part of Step S240, the method includes the event proxy server (or event router) configuring filters for the subscription. This step functions to setup processing operations of the subscription. Additionally, any suitable subscription setup that must be performed is additionally performed. In the variation where the subscriber previously has a subscription, the previous subscription may be modified to include the new subscription details. Events from multiple subscriptions of one subscriber are preferably sent to the subscriber through a single connection as described above. In the situation where a subscriber is not connected to the event router when an event occurs the event proxy server or any suitable device may queue or cache the events for delivery when the subscriber next establishes a connection.

As a person skilled in the art will recognize from the previous detailed description and from the figures and claims, modifications and changes can be made to the preferred embodiments of the invention without departing from the scope of this invention defined in the following claims.

We claim:
1. A method comprising:
  receiving, from a client device and via a network, a request to subscribe to events of one or more event types, the request including an account identifier and having an appended first verification token;

determining, by one or more processors and based on the account identifier, an encryption key;

generating, based on the encryption key and the request, a second verification token;

based on the appended first verification token matching the second verification token, establishing a subscription to events of the one or more event types;

detecting, by an event proxy server, an occurrence of an event of the one or more event types; and based on the subscription having been established, sending a notification of the event from the event proxy server to the client device.

2. The method of claim 1, wherein the first verification token comprises a hash of data comprising one or more subscription filters, the subscription filters including the one or more event types.

3. The method of claim 2, wherein the subscription filters include characteristics of the one or more event types.

4. The method of claim 1, wherein the request is sent to a Uniform Resource Locator (URL) that encodes a subscription URL and a filter.

5. The method of claim 4, wherein the first verification token comprises a hash of data comprising the subscription URL.

6. The method of claim 1, wherein the detecting of the occurrence of the event comprises receiving a notification from a message broker.

7. The method of claim 1, further comprising determining that the client device is authorized to view events for the identified account.

8. A system comprising:
a computing device configured to perform operations comprising:
receiving, from a client device and via a network, a request to subscribe to events of one or more event types, the request including an account identifier and having an appended first verification token;
determining, based on the account identifier, an encryption key;
generating, based on the encryption key and the request, a second verification token;
based on the appended first verification token matching the second verification token, establishing a subscription to events of the one or more event types; and
an event proxy server configured to perform operations comprising:
detecting an occurrence of an event of the one or more event types; and
based on the subscription having been established, sending a notification of the event to the client device.

9. The system of claim 8, wherein the first verification token comprises a hash of data comprising one or more subscription filters, the subscription filters including the one or more event types.

10. The system of claim 9, wherein the subscription filters include characteristics of the one or more event types.

11. The system of claim 8, wherein the request is sent to a Uniform Resource Locator (URL) that encodes a subscription URL and a filter.

12. The system of claim 11, wherein the first verification token comprises a hash of data comprising the subscription URL.

13. The system of claim 8, wherein the detecting of the occurrence of the event comprises receiving a notification from a message broker.

14. The system of claim 8, wherein the computing device is further configured to determine that the client device is authorized to view events for the identified account.

15. A non-transitory machine-readable medium that stores instructions that, when executed by a computing device, cause the computing device to perform operations comprising:
receiving, from a client device and via a network, a request to subscribe to events of one or more event types, the request including an account identifier and having an appended first verification token;
determining, based on the account identifier, an encryption key;
generating, based on the encryption key and the request, a second verification token;
based on the appended first verification token matching the second verification token, establishing a subscription to events of the one or more event types;
detecting, by an event proxy server, an occurrence of an event of the one or more event types; and
based on the subscription having been established, sending a notification of the event from the event proxy server to the client device.

16. The non-transitory machine-readable medium of claim 15, wherein the first verification token comprises a hash of data comprising one or more subscription filters, the subscription filters including the one or more event types.

17. The non-transitory machine-readable medium of claim 16, wherein the subscription filters include characteristics of the one or more event types.

18. The non-transitory machine-readable medium of claim 15, wherein the request is sent to a Uniform Resource Locator (URL) that encodes a subscription URL and a filter.

19. The non-transitory machine-readable medium of claim 18, wherein the first verification token comprises a hash of data comprising the subscription URL.

20. The non-transitory machine-readable medium of claim 15, wherein the operations further comprise determining that the client device is authorized to view events for the identified account.

* * * * *